(12) United States Patent
Fang et al.

(10) Patent No.: US 7,903,322 B2
(45) Date of Patent: Mar. 8, 2011

(54) ELECTRO-PHORETIC DISPLAY FILM, ELECTRO-PHORETIC DISPLAY PANEL, AND FABRICATING METHOD THEREOF

(75) Inventors: Wei-Chia Fang, Hsinchu County (TW); Chun-Hung Chu, Hsinchu (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 50 days.

(21) Appl. No.: 12/551,544

(22) Filed: Aug. 31, 2009

(65) Prior Publication Data
US 2011/0013257 A1    Jan. 20, 2011

(30) Foreign Application Priority Data

Jul. 15, 2009   (TW) ................................ 98123910 A

(51) Int. Cl.
*G02B 26/00*   (2006.01)
*G02F 1/1339*   (2006.01)
(52) U.S. Cl. ........................................ 359/296; 349/153
(58) Field of Classification Search .................. 345/107; 349/153; 359/296
See application file for complete search history.

(56) References Cited

U.S. PATENT DOCUMENTS

| 6,545,410 | B1 * | 4/2003 | Wu et al. ....................... | 313/582 |
| 7,705,957 | B2 * | 4/2010 | Whitehead et al. ........... | 349/153 |
| 2009/0237775 | A1 * | 9/2009 | Ito et al. ....................... | 359/296 |
| 2010/0007842 | A1 * | 1/2010 | Terao et al. ................... | 349/153 |

FOREIGN PATENT DOCUMENTS

| CN | 1192717 | | 9/1998 |
| CN | 100412677 | C | 8/2008 |
| CN | 101452798 | A * | 6/2009 |
| JP | 2000-310784 | | 11/2000 |
| JP | 2007-264249 | | 10/2007 |
| TW | 530133 | | 5/2003 |
| TW | 556709 | | 10/2003 |
| TW | I223729 | | 11/2004 |
| TW | I276903 | | 3/2007 |
| TW | I308231 | | 4/2009 |

* cited by examiner

*Primary Examiner* — David N Spector
(74) *Attorney, Agent, or Firm* — Jianq Chyun IP Office

(57) ABSTRACT

An electro-phoretic display film includes a conductive layer, a dielectric layer disposed on the conductive layer, a plurality of electro-phoretic display media, and a sealing material. The dielectric layer has a plurality of micro-cups arranged in an array and a trench surrounding the micro-cups. The electro-phoretic display media are exclusively disposed within the micro-cups, and the sealing material is exclusively disposed within the trench.

17 Claims, 4 Drawing Sheets

ELECTRO-PHORETIC DISPLAY FILM, ELECTRO-PHORETIC DISPLAY PANEL, AND FABRICATING METHOD THEREOF

CROSS-REFERENCE TO RELATED APPLICATION

This application claims the priority benefit of Taiwan application serial no. 98123910, filed Jul. 15, 2009. The entirety of the above-mentioned patent application is hereby incorporated by reference herein and made a part of specification.

BACKGROUND OF THE INVENTION

1. Field of the Invention

The application relates to an electro-phoretic display film and a fabricating method thereof. More particularly, the application relates to an electro-phoretic display panel and a fabricating method thereof.

2. Description of Related Art

Recently, developing and prospering flexible displays, electronic paper, and electronic books employ display media that include liquid crystals, electro-phoretic display media, electro-chromic display media, electrolytic depositing display media, and so on. Here, electro-phoretic displays utilizing the electro-phoretic display media draw the most attention. Mass production of the electro-phoretic displays has been proposed in the related art, such as R.O.C. patents nos. TWI 276903, TWI 223729, TWI 308231, and so forth.

The electro-phoretic display media of the electro-phoretic displays are rather sensitive to moisture and oxygen and are easily damaged thereby. Accordingly, a packaging process is often performed on an electro-phoretic display panel after the electro-phoretic display panel is formed by the technologies proposed in the aforesaid R.O.C. patents nos. TWI 276903, TWI 223729, and TWI 308231. In the packaging process subsequently performed on the electro-phoretic display panel, the electro-phoretic display is frequently encapsulated by a water-oxygen-resistant layer and a water-oxygen-resistant sealant, such that the electro-phoretic display panel is not damaged by moisture and oxygen easily.

FIG. 1 is a schematic cross-sectional view illustrating a conventional electro-phoretic display panel on which a packaging process is already performed. As indicated in FIG. 1, the conventional electro-phoretic display panel 100 includes an electro-phoretic display film 110, a thin film transistor (TFT) array substrate 120, a water-oxygen-resistant layer 130, and a water-oxygen-resistant sealant 140. The TFT array substrate 120 includes a TFT array (not shown) disposed on a substrate (not shown). The electro-phoretic display film 110 includes a dielectric layer 112 having a plurality of micro-cups 112a, a conductive layer 114, and a plurality of electro-phoretic display media 116 located within the micro-cups 112a. The electro-phoretic display film 110 and the TFT array substrate 120 are bonded together, such that the electro-phoretic display media 116 within the micro-cups 112a are located between the conductive layer 114 and the TFT array substrate 120. The water-oxygen-resistant layer 130 covers an outer surface (i.e. an upper surface or a surface which is not in contact with the dielectric layer 112) of the conductive layer 114. The water-oxygen-resistant sealant 140 covers an edge of the water-oxygen-resistant layer 130, a sidewall of the electro-phoretic display film 110, and a partial edge of the TFT array substrate 120.

Due to insufficient water and oxygen resistance of the electro-phoretic display film 110, the water-oxygen-resistant layer 130 and the water-oxygen-resistant sealant 140 are utilized in the related art to prevent moisture and oxygen from damaging the electro-phoretic display film 110. Nonetheless, utilization of the water-oxygen-resistant layer 130 and the water-oxygen-resistant sealant 140 results in complicated fabrication and high costs of the conventional electro-phoretic display panel 100. Moreover, the entire thickness of the conventional electro-phoretic display panel 100 is increased because of the water-oxygen-resistant layer 130 and the water-oxygen-resistant sealant 140.

SUMMARY OF THE INVENTION

The application is directed to an electro-phoretic display film and a fabricating method thereof.

The application is further directed to an electro-phoretic display panel and a fabricating method thereof.

In the application, an electro-phoretic display film including a conductive layer, a dielectric layer disposed on the conductive layer, a plurality of electro-phoretic display media, and a sealing material is provided. The dielectric layer has a plurality of micro-cups arranged in an array and a trench surrounding the micro-cups. The electro-phoretic display media are exclusively disposed within the micro-cups, and the sealing material is exclusively disposed within the trench.

In the application, an electro-phoretic display panel including an active device array substrate and the aforesaid electro-phoretic display film is also provided. The electro-phoretic display film is disposed on the active device array substrate. The active device array substrate has a plurality of pixel electrodes arranged in an array, and each of the electro-phoretic display media is respectively located between one of the pixel electrodes and the conductive layer.

According to an exemplary embodiment of the invention, each of the micro-cups is a polygonal column space, an elliptic-cylindrical space, or a cylindrical space.

According to an exemplary embodiment of the invention, a depth of each of the micro-cups is greater than, less than, or substantially equal to a thickness of each of the electro-phoretic display media.

According to an exemplary embodiment of the invention, the electro-phoretic display media do not directly contact the conductive layer.

According to an exemplary embodiment of the invention, each of the electro-phoretic display media includes a dielectric solvent and a plurality of charge particles mixed in the dielectric solvent.

According to an exemplary embodiment of the invention, a depth of the trench is greater than, less than, or substantially equal to a depth of each of the micro-cups.

According to an exemplary embodiment of the invention, a width of the trench is greater than a width of each of the micro-cups.

According to an exemplary embodiment of the invention, the trench is a ring-shaped trench.

In the application, a method of fabricating an electro-phoretic display film is also provided. In the method, first, a conductive layer is provided. Next, a dielectric layer is formed on the conductive layer, and the dielectric layer is embossed to form a plurality of micro-cups arranged in an array and a trench surrounding the micro-cups in the dielectric layer. Thereafter, a plurality of electro-phoretic display media are disposed within the micro-cups, and a sealing material is disposed within the trench.

In the application, a method of fabricating an electro-phoretic display panel is also provided. In the method, first, an active device array substrate is provided. The active device array substrate has a plurality of pixel electrodes arranged in an array. Next, an electro-phoretic display film is formed by the aforesaid method, and the electro-phoretic display film is disposed on the active device array substrate. Each of the electro-phoretic display media is respectively located between one of the pixel electrodes and the conductive layer.

Based on the above, the micro-cups and the trench surrounding the micro-cups are formed in the dielectric layer according to the invention. Accordingly, moisture and oxygen are blocked by the sealing material disposed within the trench, and reliability of the electro-phoretic display film and the electro-phoretic display panel can be further enhanced.

In order to make the aforementioned and other features and advantages of the invention more comprehensible, several embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
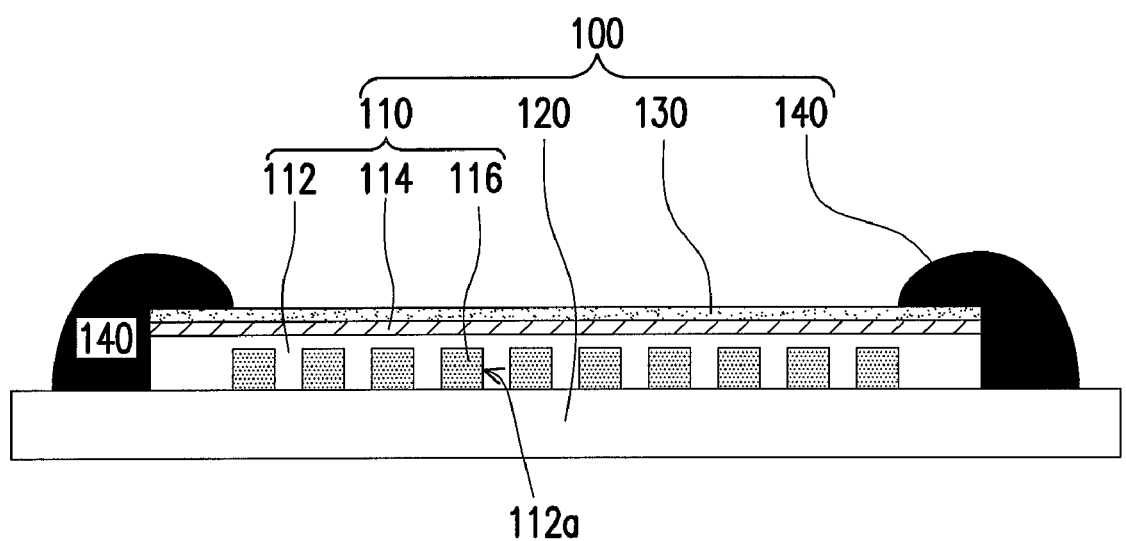
FIG. 1 is a schematic cross-sectional view illustrating a conventional electro-phoretic display panel on which a packaging process is already performed.
Figure 2A:
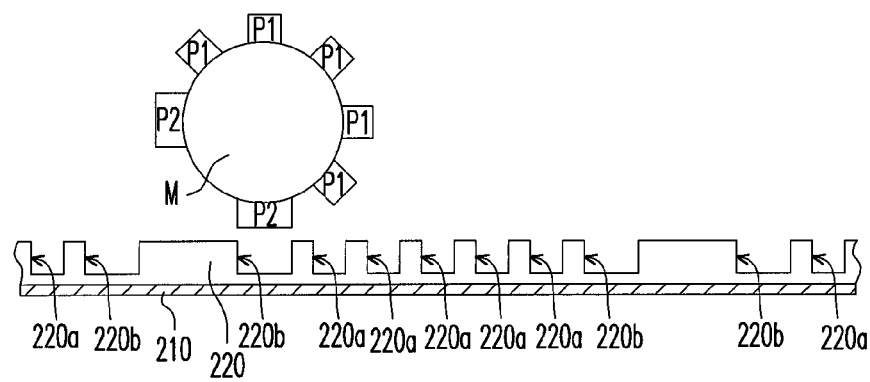
FIGS. 2A, 3A, and 4A are cross-sectional flow charts illustrating a fabricating process of an electro-phoretic display panel according to an exemplary embodiment of the invention.
Figure 2B:
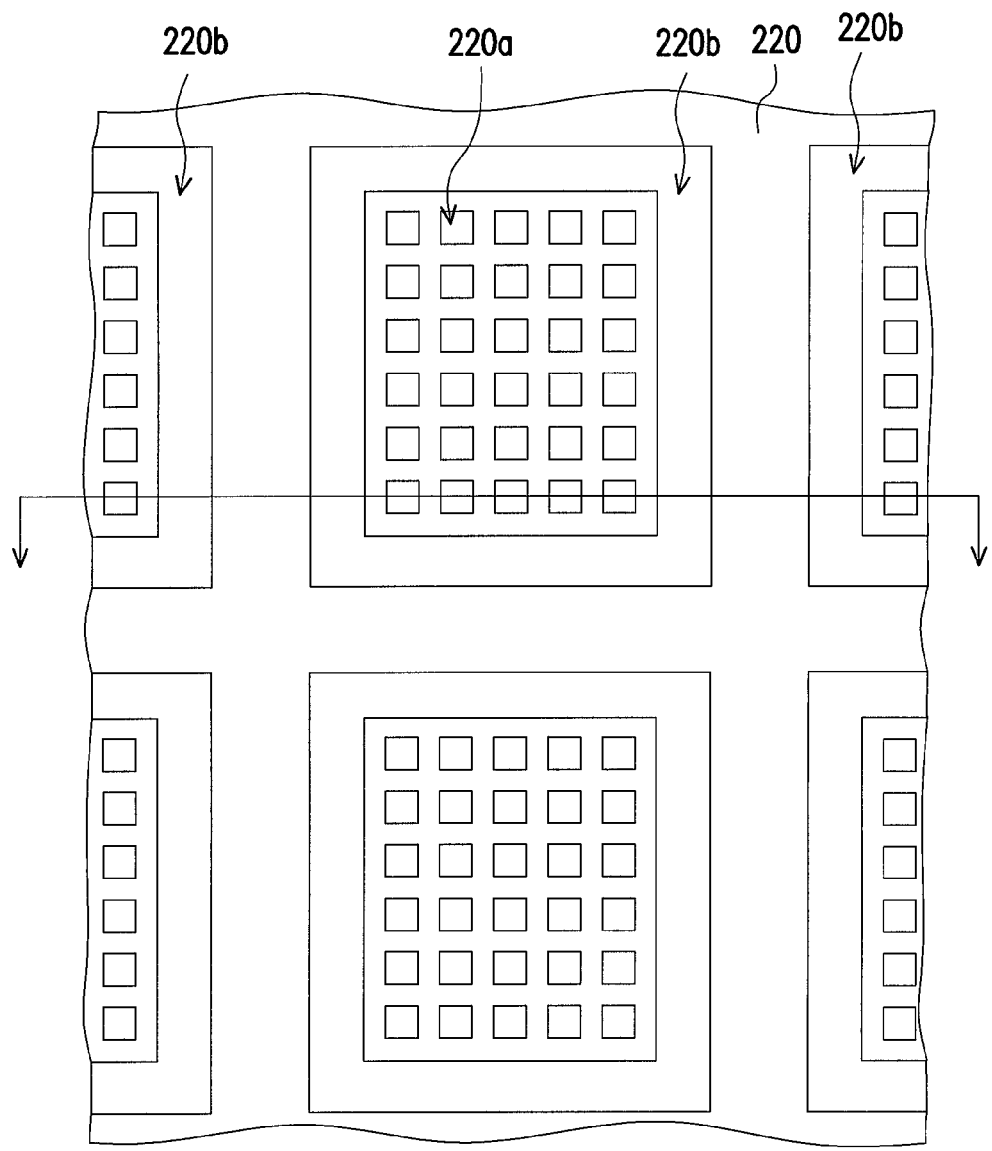
FIGS. 2B and 3B are cross-sectional top views illustrating a fabricating process of an electro-phoretic display film according to an exemplary embodiment of the invention.
Figure 3A:
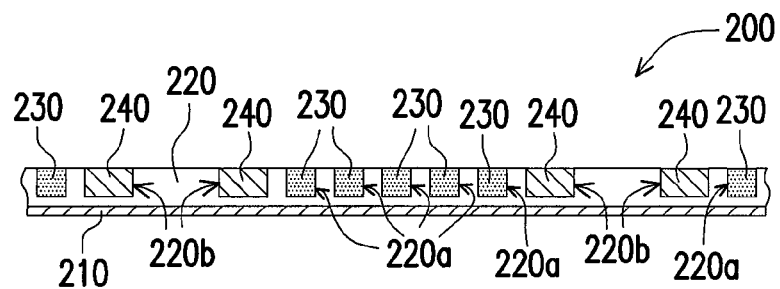
Figure 3B:
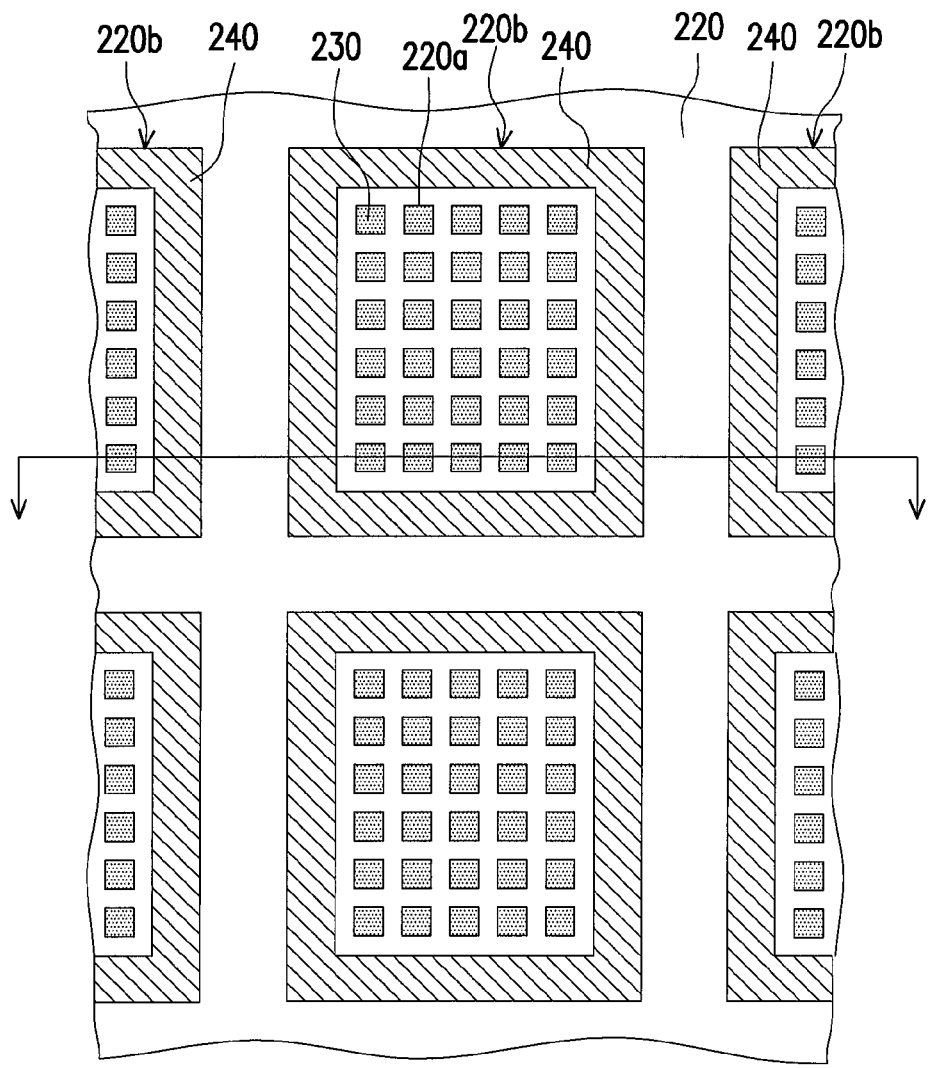
Figure 4A:
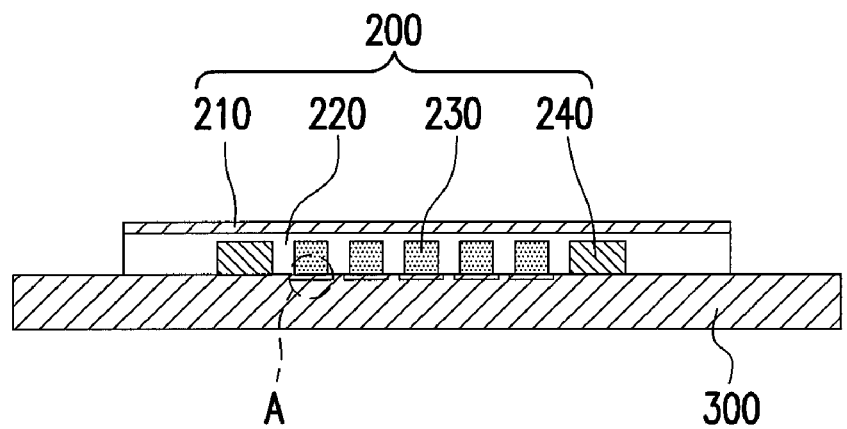

FIGS. 2A, 3A, and 4A are cross-sectional flow charts illustrating a fabricating process of an electro-phoretic display panel according to an exemplary embodiment of the invention. FIGS. 2B and 3B are cross-sectional top views illustrating a fabricating process of an electro-phoretic display film according to an exemplary embodiment of the invention. First, as shown in FIGS. 2A and 2B, a conductive layer 210 and a dielectric layer 220 bonded to the conductive layer 210 are provided. In this embodiment, a material of the conductive layer 210 is metal or any other conductive material characterized by great reflectivity, for example, and a material of the dielectric layer 220 is an organic dielectric material or an inorganic dielectric material equipped with great dielectric properties, for example. After that, a plurality of micro-cups 220a arranged in an array and a trench (or namely trough, groove, ditch, channel) 220b surrounding the micro-cups 220a are formed in the dielectric layer 220. In this embodiment, for instance, the micro-cups 220a and the trench 220b are formed by performing an embossing process, a photolithography and etching process, and so on.

It can be observed from FIGS. 2A and 2B that the micro-cups 220a of this embodiment are rectangular column spaces, which should not be construed as is limited in the invention. The micro-cups 220a can also be polygonal column spaces, elliptic-cylindrical spaces, or cylindrical spaces. Besides, the trench 220b of this embodiment can be a ring-shaped trench (or namely ringlike trench, annular-shaped trench, circular-shaped trench, loop-shaped trench). Note that the shape, the dimension, and the number of the ring-shaped trench can be modified based on actual design demands and should not limited to those described in the invention.

According to this embodiment, the same process, e.g. the embossing process or the photolithography and etching process, can be performed to simultaneously form the micro-cups 220a and the trench 220b in the dielectric layer 220. For instance, given that the embossing process is performed as shown in FIG. 2A, a mold M is first rolled on the dielectric layer 220, such that protrusions P1 and P2 on the mold M are inserted into the dielectric layer 220 to form the micro-cups 220a and the trench 220b. In this embodiment, a depth of each of the micro-cups 220a is substantially equal to a depth of the trench 220b, while a width of each of the micro-cups 220a is substantially less than a width of the trench 220b. Nonetheless, the widths and the depths of the micro-cups 220a and the trench 220b can be adjusted according to actual demands. In detail, through adjusting a height of the protrusions P1 and P2 on the mold M, the depth of the trench 220b can be substantially greater than or substantially less than the depth of each of the micro-cups 220a. Additionally, through adjusting a shape and a width of the protrusion P1 on the mold M, the shape and the width of each of the micro-cups 220a can be easily modified. Likewise, through adjusting a shape and a width of the protrusion P2 on the mold M, the shape and the width of the trench 220b can be easily modified.

Next, as indicated in FIGS. 3A and 3B, after formation of the micro-cups 220a and the trench 220b, a plurality of electro-phoretic display media 230 are then formed within the micro-cups 220a, and a sealing material 240 is formed within the trench 220b. Thereby, fabrication of the electro-phoretic display film 200 is completed. According to this embodiment, each of the electro-phoretic display media 230 includes a dielectric solvent and a plurality of charge particles mixed (or namely doped, intermixed, blended, mingled) in the dielectric solvent.

It can be observed from FIGS. 3A and 3B that the electro-phoretic display film 200 of this embodiment includes the conductive layer 210, the dielectric layer 220 disposed on the conductive layer 210, the electro-phoretic display media 230, and the sealing material 240. The dielectric layer 220 has the micro-cups 220a arranged in an array and the trench 220b surrounding the micro-cups 220a. The electro-phoretic display media 230 are exclusively disposed within the micro-cups 220a, and the sealing material 240 is exclusively disposed within the trench 220b.

In this embodiment, a thickness of each of the electro-phoretic display media 230 is substantially equal to the depth of each of the micro-cups 220a. Nevertheless, according to other embodiments of the invention, the thickness of each of the electro-phoretic display media 230 can also be substantially greater than or substantially less than the depth of each of the micro-cups 220a. Besides, note that the depth of each of the micro-cups 220a and the depth of the trench 220b are both substantially less than a thickness of the dielectric layer 220, and therefore the electro-phoretic display media 230 within the micro-cups 220a and the sealing material 240 within the trench 220b are not in direct contact with the conductive layer 210.

Please refer to FIG. 3B. An area surrounded by the sealing material 240 is usually defined as a display region. The electro-phoretic display media 230 are located within the display region surrounded by the sealing material 240, while the sealing material 240 is located in a non-display region outside the display region. Each display region can be considered as a display unit (i.e. a display panel). Alternatively, the display regions can all be considered as one display unit (i.e. a display panel). As indicated in FIGS. 3A and 3B, when one or more of the display regions are considered as one display unit, the dielectric layer 220 disposed between the sealing material 240 located around adjacent display units preferably has a width substantially greater than a width of the dielectric layer 220 between any two of the micro-cups 220a in each display unit, which is conducive to implementation of a subsequent cutting process and contributes to favorable water resistance and oxygen resistance. However, in other embodiments, given that the sealing material 240 located around the adjacent display units has satisfactory water resistance and oxygen resistance, and that the cutting process can be precisely carried out, the dielectric layer 220 disposed between the sealing material 240 located around the adjacent display units can have a width substantially equal to or less than the width of the dielectric layer 220 between any two of the micro-cups 220a in each display unit.

The electro-phoretic display film 200 of this embodiment is equipped with the sealing material 240 characterized with favorable water resistance and oxygen resistance after the electro-phoretic display film 200 is formed. However, when the sealing material 240 formed within the trench 220b is not characterized by sufficient water resistance and oxygen resistance, the width of the trench 220b ought to be substantially greater than the width of each of the micro-cups 220a. Accordingly, the sealing material 240 of the electro-phoretic display film 200 can simplify complexity of the subsequent packaging process, improve yield, lower down the costs, and reduce the thickness of the electro-phoretic display film 200.

Figure 4B:
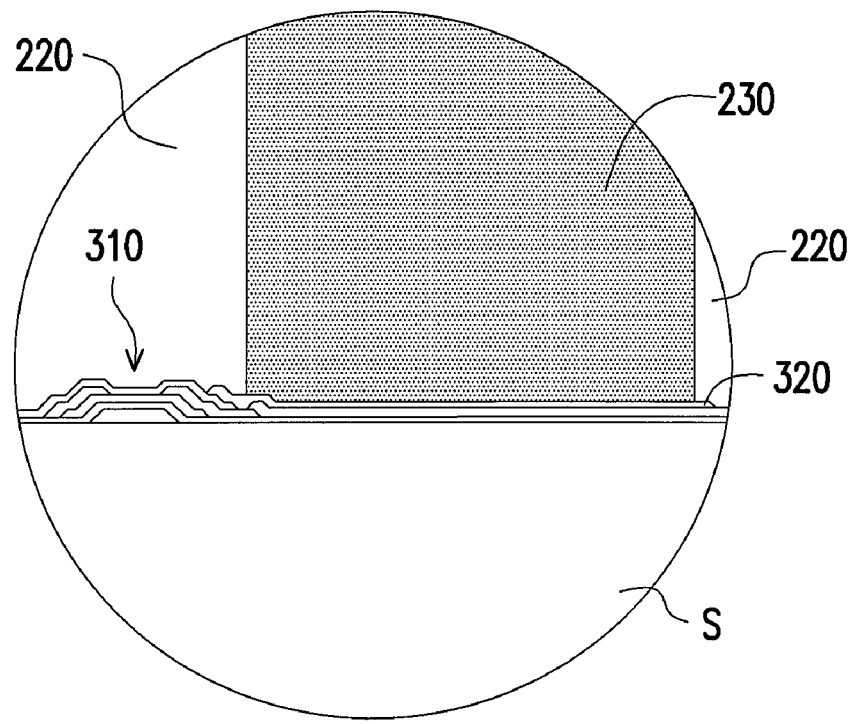
FIG. 4B is an enlarged view of an area A depicted in FIG. 4A.

FIG. 4B is an enlarged view of an area A depicted in FIG. 4A. As indicated in FIGS. 4A and 4B, an active device array substrate 300 is provided. The active device array substrate 300 has a plurality of pixel electrodes 320 arranged in an array. Specifically, the active device array substrate 300 mainly contains a substrate S, a plurality of scan lines (not shown), a plurality of data lines (not shown), a plurality of active devices 310, and a plurality of pixel electrodes 320. Next, the aforesaid electro-phoretic display film 200 is bonded to the active device array substrate 300, such that each of the electro-phoretic display media 230 is respectively located between one of the pixel electrodes 320 and the conductive layer 210. The electro-phoretic display media 230 located within the micro-cups 220a can be driven by the corresponding pixel electrodes 320 to display specific images. Moreover, when the pixel electrodes 320 are made of a reflective material, such as metal or any other material characterized by reflectivity, the conductive layer 210 can be made of a transparent conductive material, such as indium tin oxide (ITO), indium zinc oxide (IZO), aluminum tin oxide (ATO), aluminum zinc oxide (AZO), indium germanium zinc oxide (IGZO), any other appropriate material, or a combination thereof. By contrast, when the pixel electrodes 320 are made of the aforesaid transparent conductive material, the conductive layer 210 is made of the reflective material, such as metal or any other material characterized by reflectivity. When parts of the pixel electrodes 320 are made of the reflectively material, and the other parts of the pixel electrodes 320 are made of the transparent conductive material, the conductive layer 210 can be made of the transparent conductive material and the reflective material as mentioned above or the conductive layer 210 can be made of the transparent conductive material as mentioned above. When a portion of the conductive layer 210 corresponding to each of the micro-cups 220a is made of the transparent conductive material, and the pixel electrodes 320 corresponding to the micro-cups 220a are made of the transparent conductive material as well, the electro-phoretic display panel can be a double-sided display panel.

Please refer to FIG. 4A. In this embodiment, the micro-cups 220a and the trench 220b surrounding the micro-cups 220a are simultaneously formed in the dielectric layer 220. Hence, moisture and oxygen can be blocked by the sealing material 240 disposed within the trench 220b according to this embodiment, and reliability of the electro-phoretic display panel can also be enhanced.

What is claimed is:

1. An electro-phoretic display film, comprising:
   a conductive layer;
   a dielectric layer disposed on the conductive layer, the dielectric layer having a plurality of micro-cups arranged in an array and a trench surrounding the micro-cups;
   a plurality of electro-phoretic display media exclusively disposed within the micro-cups; and
   a sealing material exclusively disposed within the trench.

2. The electro-phoretic display film of claim 1, wherein each of the micro-cups is a polygonal column space, an elliptic-cylindrical space, or a cylindrical space.

3. The electro-phoretic display film of claim 1, wherein a depth of each of the micro-cups is greater than a thickness of each of the electro-phoretic display media.

4. The electro-phoretic display film of claim 1, wherein a depth of each of the micro-cups is less than a thickness of each of the electro-phoretic display media.

5. The electro-phoretic display film of claim 1, wherein a depth of each of the micro-cups is substantially equal to a thickness of each of the electro-phoretic display media.

6. The electro-phoretic display film of claim 1, wherein the electro-phoretic display media do not directly contact the conductive layer.

7. The electro-phoretic display film of claim 1, wherein each of the electro-phoretic display media comprises a dielectric solvent and a plurality of charge particles mixed in the dielectric solvent.

8. The electro-phoretic display film of claim 1, wherein a depth of the trench is greater than a depth of each of the micro-cups.

9. The electro-phoretic display film of claim 1, wherein a depth of the trench is less than a depth of each of the micro-cups.

10. The electro-phoretic display film of claim 1, wherein a depth of the trench is substantially equal to a depth of each of the micro-cups.

11. The electro-phoretic display film of claim 1, wherein a width of the trench is greater than a width of each of the micro-cups.

12. The electro-phoretic display film of claim 1, wherein the trench comprises a ring-shaped trench.

13. An electro-phoretic display panel, comprising:
   an active device array substrate; and
   the electro-phoretic display film of claim 1, the electro-phoretic display film being disposed on the active device array substrate, wherein the active device array substrate has a plurality of pixel electrodes arranged in an array, and each of the electro-phoretic display media is respectively located between one of the pixel electrodes and the conductive layer.

14. A method of fabricating an electro-phoretic display film, comprising:
   providing a conductive layer;
   forming a dielectric layer on the conductive layer and embossing the dielectric layer to form a plurality of micro-cups arranged in an array and a trench surrounding the micro-cups in the dielectric layer;

disposing a plurality of electro-phoretic display media within the micro-cups; and exclusively disposing a sealing material within the trench.

15. The method of claim 14, wherein the electro-phoretic display media do not directly contact the conductive layer.

16. The method of claim 14, wherein a width of the trench is greater than a width of each of the micro-cups.

17. A method of fabricating an electro-phoretic display panel, comprising:

providing an active device array substrate, the active device array substrate having a plurality of pixel electrodes arranged in an array; and forming an electro-phoretic display film by the fabricating method of claim 14 and disposing the electro-phoretic display film on the active device array substrate, wherein each of the electro-phoretic display media is respectively located between one of the pixel electrodes and the conductive layer.

* * * * *